US007248184B2

(12) United States Patent
Gelhar et al.

(10) Patent No.: US 7,248,184 B2
(45) Date of Patent: Jul. 24, 2007

(54) SYSTEM FOR PROCESSING DIGITAL MAP DATA

(75) Inventors: Jens Gelhar, Hamburg (DE); Harald Lüssen, Hamburg (DE); Philipp Harald Nagel, Seevetal (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 134 days.

(21) Appl. No.: 10/912,881

(22) Filed: Aug. 5, 2004

(65) Prior Publication Data

US 2005/0107950 A1 May 19, 2005

(30) Foreign Application Priority Data

Aug. 5, 2003 (EP) ................... 03017898

(51) Int. Cl.
*G08G 1/123* (2006.01)
(52) U.S. Cl. ................. 340/990; 340/995; 340/539.11; 340/5.61; 701/29; 701/32; 701/34
(58) Field of Classification Search ........... 340/995.19, 340/995.1, 995.13, 990, 995, 539.11, 5.61; 701/203, 208, 211, 210, 29, 32, 34
See application file for complete search history.

(56) References Cited

U.S. PATENT DOCUMENTS

| | | | | |
|---|---|---|---|---|
| 5,475,387 A | * | 12/1995 | Matsumoto | ........... 340/990 |
| 5,729,458 A | * | 3/1998 | Poppen | ........... 705/400 |
| 6,882,933 B2 | * | 4/2005 | Kondou et al. | ........... 701/203 |
| 2002/0169543 A1 | | 11/2002 | Blewitt | |
| 2005/0010360 A1 | * | 1/2005 | Nagase et al. | ........... 701/210 |
| 2005/0027434 A1 | * | 2/2005 | Hirose | ........... 701/117 |

FOREIGN PATENT DOCUMENTS

EP 0 372 840 A2 11/1989

OTHER PUBLICATIONS

Alois Fuchs, et al. "EVA-Netzabbildung und Routensuche für ein fahrzeugautonomes Ortungs-und Navigationssystem" and English translation "Eva Network Simulation And Route Search For An Autonomous Vehicle Location And Navigation System", Zeitschrift 36 (1983), No. 4 (April), pp. 200-223.

* cited by examiner

*Primary Examiner*—Tai Nguyen
(74) *Attorney, Agent, or Firm*—Brinks Hofer Gilson & Lione

(57) ABSTRACT

A method for processing digital map data for route determination is provided that includes dividing a region into a plurality of zones, and for the zones, automatically determining at least one cost value for at least one direction of travel of the zone based on the digital map data of the zone and a predetermined cost criterion. A method for determining a route between two points is provided that includes dividing a region into a plurality of zones, for the zones, automatically determining at least one cost value for at least one direction of travel of the zone based on the digital map data of the zone and a predetermined cost criterion, and automatically determining at least one sequence of zones connecting the two points, where each zone of the sequence may be adjacent to another zone of the sequence, such that the sum of the cost values of the zones of the sequence may be optimized.

36 Claims, 4 Drawing Sheets

SYSTEM FOR PROCESSING DIGITAL MAP DATA

PRIORITY CLAIM

This application claims the benefit of European Patent Application No. EP 03 017 898.2, filed Aug. 5, 2003, which is hereby incorporated by reference herein in its entirety.

BACKGROUND OF THE INVENTION

1. Technical Field

This application relates to a system and method for processing digital map data. In particular, this application relates to a system and method for processing digital map data for route determination and determining a route between two points.

2. Related Art

Navigation systems have uses in may different areas that provide a user with information on how to reach a predetermined destination starting from a predetermined starting point. For example, navigation systems are implemented in handheld navigation devices. In addition, vehicles of all types, including land and marine vehicles, are increasingly equipped with navigation systems.

In a vehicle, a navigation system may assist the driver by providing driving instructions to a particular destination. The driver may input a desired destination, for example, by choosing a specific destination from a list of previously stored destinations provided by the device, or by entering destination coordinates. The navigation system determines the vehicle's current position, for example, by way of a global positioning system (GPS). The navigation system may also use additional items, for example movement sensors, to determine current position. The user of the navigation system also may manually input the location of the vehicle. Based on the starting point (the current position of the vehicle) and the desired destination point, the navigation system then determines a route for reaching the destination from the starting point, including, but not necessarily limited to information, for example, relating to the roads.

To navigate a route, a navigation system may use digital map data. In a land vehicle, such as a car or truck, the digital map may include road data. The map may also include information such as topographical information associated with the road data. The roads may be classified such that a navigation system using the digital map data may distinguish between a small road and a highway. With the starting and ending points and the digital map data, a navigation device may determine, based on predetermined criteria, how to reach the ending point. The route information may then be provided to the user in the form of all of the roads to be taken to reach the destination.

Route determination may be performed in a relatively small scale or "local" level, such as on the level of the roads. For example, in the context of a land vehicle such as a car, all possible roads within a region are considered when determining the route. When the starting point and desired destination are far from each other, route determination may require accessing and processing large amounts of data, resulting in costly and time consuming computations. Thus, there is a need for a navigation system that provides a simpler and faster determination of a route.

SUMMARY

This application provides a system for processing digital map data for route determination. In particular, a system for processing digital map data is provided the comprises dividing a region in to a plurality of zones, and for each zone, automatically determining a cost value for at least one direction of travel of the zone based on the digital map data of the zone and a predetermined cost criterion. A cost value may be a numerical value that has been assigned to a zone according to a predetermined cost criterion. Based on the predetermined cost criterion, each zone is weighted and given a rating. Cost values represent, for example, the estimated time it will take to travel through a zone, the distance required to pass through the zone, the amount of tolls that may have to be paid to traverse the zone, and the like. Because a region has been divided into a plurality of zones, with each zone having been assigned a cost value, a first processing of the digital map data is provided that may simplify further processing. The region may be tiled in which there are no gaps and the zones (or tiles) overlap only at their edges to provide a grid of zones.

This application also provides a system for determining a route between two points comprising providing processed digital map data and automatically determining at least one sequence of zones connecting the two points, where each zone of the sequence is adjacent another zone of the sequence to optimize the overall cost value of the zone sequence. Thus, a "route" is obtained on the level of zones between two points, and the determined sequence of zones may represent the zones which are passed through to go from one point to another point. The sequence of the zones is determined to optimize the overall cost value of the zones of the sequence. For example, the overall cost value of the sequence of the zones may be the sum of the cost values of the zones of the sequence.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

This application relates to a system for processing digital map data. In particular, this application relates to a system for processing digital map data for route determination and determining a route between two points. The system includes methods for processing digital map data for route determination and for determining a route between two points.

Digital map data may include map data representing a region that is divided into a plurality of zones. A cost value may be assigned to each zone based on predetermined cost criterion. A cost value may be a numerical value that represents some aspect related to traveling through the zone. For example, a cost value may represent the amount of estimated time it should take to travel through the zone. A cost value may also represent the distance that may be required to pass through the zone. In another example, the cost value may be related to the amount of tolls that must be paid to pass through the zone. Each of these criteria can represent a single cost value or can be combined to form a cost value for a zone. For example, the time required to travel through the zone may be multiplied by the amount that must be paid in tolls to arrive at a combined cost value. In this manner, the resulting cost values allow different zones to be compared. These examples are non-limiting and any number of other aspects may be used alone or in combination to arrive at a cost value for a zone.

Further, in many instances, there are numerous alternative ways to pass through a zone. For example, a zone can be traversed from north to south and east to west (and vice versa). Thus, there may be different travel directions for a zone. For each such travel direction a cost value may be determined. Further, depending on the cost criterion, the cost value to traverse a zone from north to south may be different than the cost value to traverse the zone from south to north.

Depending on the intended use of the map data, several parameters may be relevant in a specific context. In this case, as set forth above, a combined criterion can be based on different parameters to arrive at a single cost value for a zone. Alternatively, different cost values (each according to a different cost criterion) can be determined, for example for a single travel direction in a zone. Thus, different sets of cost values may be obtained, with each set corresponding to cost values determined from specific criterion. If there are different possible routes through a zone along a specific direction, each cost value may be determined depending on the smallest passing distance and/or travel time. This applies correspondingly to other fields of application where roads are of minor relevance and, for example the topography or others issues may be of higher importance.

Figure 1:
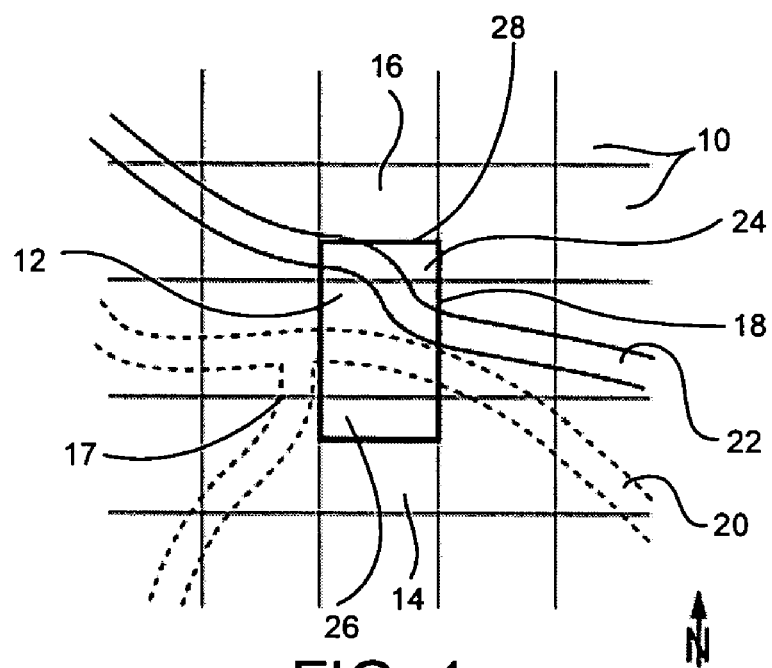
FIG. 1 illustrates tiling a region.

FIG. 1 illustrates a method for procession digital map data for determining a route comprising dividing a region into a plurality of zones, and, for each zone, automatically determining a cost value for at least one travel direction of the zone based on the digital map data of the zone and a predetermined cost criterion.

A map of a region is shown in FIG. 1. The region is divided into a plurality of zones 10. The zones 10 of FIG. 1 are shown as squares that periodically tile the region. In this way, the zones may cover the region from edge to edge without gaps between the zones and the zones may overlap only at their edges. FIG. 1 may be of particular relevance in the context of land-based navigation, such as in an automobile. The region shown in FIG. 1 is square tiled, although other tiling configurations are contemplated.

Figure 2:
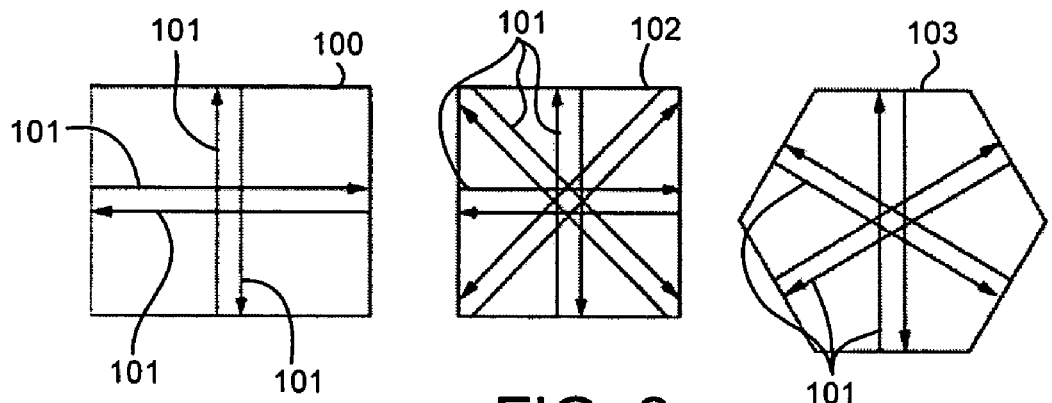
FIG. 2 depicts shapes of zones and corresponding travel directions.

The zones may be of any geometric shape including, polygonal such as squares, rectangles, hexagons and the like. In this manner, both the division of the region and the determination of cost values are simplified. FIG. 2 illustrates shapes of zones and corresponding direction of travels. Zone 100 is a rectangle. In this example, four directions of travel 101 are shown: left-right, right-left, up-down, and down up. From corner to corner directions of travel are also possible. Four directions of travel in a rectangular zone may be useful if the cost values for traveling in opposite directions are not equal. If it is assumed that the values for right-left, left-right are the same and up-down, down-up are the same, only two directions of travel may form the basis for determining cost values.

In FIG. 2, zone 102 is a square. In this example there may be eight directions of travel 101. As shown there may be four directions of travel parallel to the edges and four directions of travels parallel to the diagonals. Zone 103 is hexagonal and may have six directions of travel 101, two for each pair of opposing edges.

The symmetry of the divided region may simplify the comparison of cost values of the different zone. For example, with zones of hexagonal or rectangular shape, cost values may be determined for traveling through a zone from one opposing edge to the other opposing edge or one corner to an opposing corner. Thus, a weighting of all relevant traveling directions of the zone by corresponding cost values may be obtained.

In the square-tiled example of FIG. 1, cost valuation is explained with respect to zone 12. In this example, zone 12 is adjacent to eight other zones with zone 14 directly to the south and zone 16 directly to the north of zone 12. Two zones are adjacent if their boundaries overlap in at least one point. Boundary or quantization effects may be avoided by taking into account a predetermined part of an adjacent zone. For example, if a road is located in an adjacent zone, but is near the boundary of a zone, it may be considered part of the zone (though not physically in it) for the purpose of determining the zone's cost value. Thus, the zone may be extended for determining cost value.

The cost value for traveling from west to east in zone 13 (from the left edge 17 to the right edge 18) may be determined. As shown in FIG. 1, a small road 20 passes through zone 12 from left edge 17 to right edge 18. Highway 22 also crosses zone 12, but only from the top of zone also from left to right. Road 20 begins at the left edge 17 of zone 12, whereas highway 22 begins at the upper edge of zone 12 and ends at right edge of zone 12. In this example, for purposes of determining cost value, zone 12 is extended to include part 24 of adjacent zone 16, and part 26 of adjacent zone 14 (as shown by the darker bordered box 28). Thus, highway 22 may be included in the cost value determination of zone 12.

The cost value of zone 12 may be determined based on the "travel time," the time it takes to travel through zone 12. For this criterion, average driving speeds for the different roadways may be used. For example, the average driving speed on road 20 may be 30 m/hr and the average driving speed on highway 22 may be 60 m/hr. The edge length of the zones depends on the areas of the region and the scale of the corresponding map. For example, the edge length may be from about 3 to about 15 miles. In another example, the edge length may be from about 5 to about 10 miles.

Although the travel distance for road 20 is smaller (as shown in FIG. 1), the travel time for highway 22 is shorter due to the higher average driving speed. For example, if the length of highway 22 is extended to 15 miles (due to extending zone 12 to include part of zone 16), the corresponding cost value may be set at 15, since the time required to pass through zone 12 at the average driving speed for highway 22 would be 15 minutes. Corresponding cost values may be determined for other direction of travels, and other cost criteria, including combinations of relevant parameters may be used.

By dividing a region into a plurality of zones and determining a cost value for each zone, a first processing of a digital map may be obtained that simplifies further processing. For example, the determination of long distance routes on the local level (e.g., on the level of the roads) may be very time consuming. Dividing a region into zones and assigning the zones a cost value provides an intermediate level and corresponding preprocessing of the data. In addition, a local change, for example a traffic jam, may be taken into account on the level of the zones, thus avoiding the need to re-determine the route on a global or whole trip level.

The determination of the cost value my comprise determining a time dependent cost value. In other words, the cost value for a specific direction of travel of a zone may be inconstant and a function of time. Thus, varying conditions of a zone may be considered. For example, during rush hours, certain roads may have slower travel times due to a large amount of traffic on the roads.

The determination of a cost value may also include automatically re-determining a cost value of at least one zone on a regular or periodic basis and/or upon occurrence of a predetermined type of event. In other words, dynamic variations of weighting are possible if it is expected that the conditions of some or all zones may change over time. Predetermined types of events may trigger or initiate a re-determination of a cost value, thus improving precision of the system. For example, a request by a user to re-determine cost value may be such an event. In another example, a predetermined event may include receiving a traffic message regarding the status of traffic at a particular time, thus initiating a re-determination of the cost value.

Re-determining a cost value may also comprise modifying a current cost value, for example, by adding a predetermined value to a current cost value or by multiplying the current value by a predetermined value. For example, if a traffic message informing on a traffic condition is received for a particular direction of travel in a particular zone, a predetermined value for taking into account the type of traffic condition may be added to the corresponding current value. This may be particularly useful if the cost values have been determined and previously stored and only small changes are to be applied.

The system may also provide for storing each cost value for each zone, thus resulting in a data structure containing the necessary information for all of the zones of a region. This may include storing adjacency information for each zone relating to a common edge or corner of two zones. As previously defined, adjacency information may be that information relating to areas of adjacent zones to the zone of interest. Adjacency information may be stored in any number of ways. For example, when the cost values for a zone are stored, an identifier for each adjacent zone may also be stored. Alternatively, the cost values of the zones may be stored in a manner such that the data structure itself reflects the geometric relations between the zones. Adjacency information may be particularly useful when using processed digital map data to determine route information because it contains information as to the zone that follows from a particular route in a previous zone. As previously demonstrated by FIG. 1, adjacency information may also be useful when a zone is extended for purposes of assigning cost values.

Figure 3:
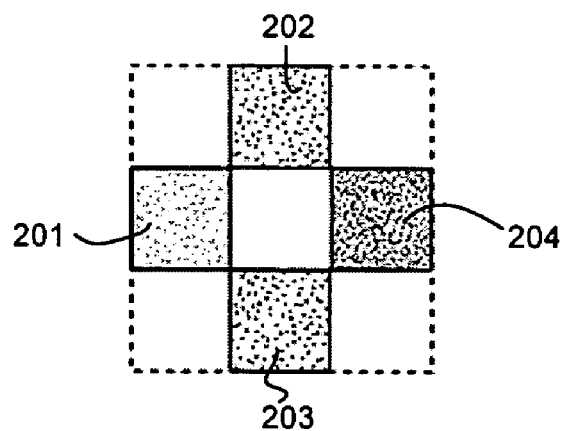
FIG. 3 is a flow diagram of a method for determining a route.

FIG. 3 is an illustration of the cost values of a zone 200 that is a square. There are four directions of travel in this example: north-south (i.e., from north to south), south-north, east-west, and west-east. In this example, the colored or shaded squares 201, 202, 203, and 204 illustrate various cost values.

Square 201, representing the east-west direction of travel, is relatively bright, which indicates that the cost value is relatively small, i.e., low route cost in this direction. Squares 202 and 203, representing the south-north and north-south directions of travel, respectively, are darker than square 201, thus, indicating a larger cost value. Therefore, the north-south and the south-north directions of travel are symmetric regarding the cost value. Square 204, representing the west-east direction of travel is the darkest square and stands for a large cost value.

Figure 4:
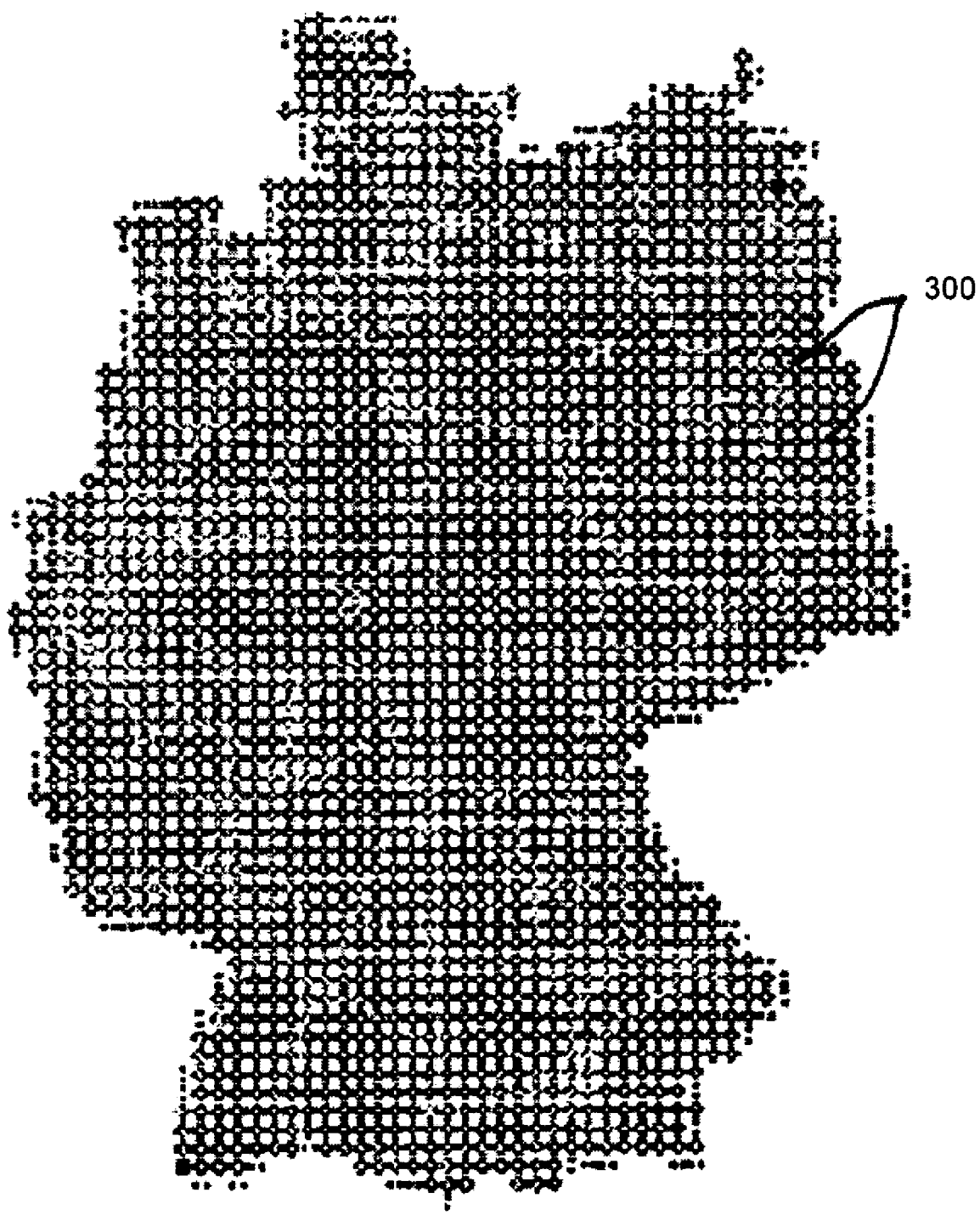
FIG. 4 illustrates cost values for a zone.

In FIG. 4, a map of the country of Germany is represented in a tiled format having square zones. Each zone 300 comprises four passing directions that are perpendicular to the edges of the zones. In this example, for each direction of travel and each zone, the cost value (representing the travel time) was determined.

The resulting cost values are illustrated in this figure using the representation shown in FIG. 3. Darker shaded parts in this example correspond to parts in which cost value is rather high. Also shown in FIG. 4 are connected parts that are relatively bright. These low route cost parts correspond to highways. The dark parts, the high route cost parts, may be due to hills and mountains, or other topological features, that require a longer time to travel through the corresponding zones.

This application also provides a method for determining a route between two points comprising providing processed digital map data, as determined above, and automatically determining at least one sequence of zones connecting the two points, where each zone of the sequence is adjacent to another zone of the sequence so that the overall cost value of the sequence of zones may be optimized. This method may yield a "route" of the zones between two points that may be used, for example with car navigation, to determining the actual road route between the points. The determined sequence of zones comprises the zones that may be traveled from the one point to the other point.

The sequence of the zones may be determined so that the overall cost value of the sequence of zones is optimized. The overall cost value may be given by the sum of the cost values of the zones of the sequence. The optimization criterion may depend on the type of cost values. For example, if the cost criterion is the travel time and the resulting cost values are proportional to the travel time of a zone, the optimization criterion may the minimization of the overall travel time or journey time, i.e., to minimize the sum of the travel times in passing through the zones between the one point and the other point. When using other cost values, the optimization may involve maximization.

Figure 5:
FIG. 5 illustrates cost values for tiling an entire region.

An example with sequences of zones is shown in FIG. 5. In this example also, the contour of Germany is depicted. In this case, a route was determined starting from the southeast and leading to the northwest based on previously determined cost values. Each square 300 shown in this figure represents a zone with square shape. Given the starting point and the endpoint, all possible sequences of zones connecting these points were determined. The shade of the squares shown in the figure corresponds to the overall travel time. The darkest squares belong to optimal sequences 302 of zones. As shown, there is more than one optimal sequence.

The shade of the other squares relates to the difference in journey time of the corresponding sequence compared to the journey time of the optimal sequences. If a square belongs to a route, the travel time of which differs only slightly from the travel time of the optimal routes, its shade is still dark but slightly brighter than the shade of the squares belonging to the optimal sequences. Thus, FIG. 5 illustrates the possible sequences of zones connecting the starting point and the destination point and their relation regarding the travel time for each sequence.

A sequence of zones may be determined in any number of ways. For example, algorithms may be used that find the shortest path from one vertex to another vertex in a weighted graph. In this case, the weights of the edges of the graph may be determined by the cost values. The graph may be an ordered graph (where the edges are ordered pairs of vertices) or an undirected graph (where the edges are unordered pairs of vertices). If, for example, the travel direction from north to south in a zone is distinguishable from the travel direction from south to north, the corresponding graph would be a directed graph.

Different algorithms are known to solve for the shortest path (the optimal sequence of zones). Possible algorithms may include, but are not limited to, for example, Dijkstra's algorithm, the Bellman Ford algorithm, Johnson's algorithm, the A star algorithm, as well as other algorithms that are currently known or may be developed for this purpose.

In addition, all sequences of zones connecting the two points, where each zone of a sequence is adjacent to another zone of the sequence, may be automatically determined so that the overall cost value each of the sequences of zones does not differ from the overall cost value of an optimal sequence by more than a predetermined threshold.

Thus, several alternative sequences of the zones that have similar overall cost values may be provided. This is useful if, during further processing of the digital map data, constraints are imposed, for example, because some of the sequences of zones are eliminated. In addition, the alternatives may be presented to a user to choose from.

The method also may comprise determining for each zone a difference between the overall cost value of a sequence containing the zone and the overall cost value of a sequence that is optimal. Thus, each zone may be classified according to the zones that comprise an optimal sequence. For each zone, the difference to be determined may be the difference between the globally optimal sequence and a best sequence comprising this zone. Usually, a zone is part of different sequences connecting two points. Thus, only the best (according to a corresponding optimization criterion) sequence may be selected for determining the difference from the globally optimal sequence. This information may be used, for example, during a re-determination, if the cost value of one zone that is part of the optimal sequence changes so that the sequence that was optimal is no longer optimal. In such a case, a new optimal sequence may be determined.

The method may also comprise automatically re-determining the at least one sequence of zones connecting the two points on a regular basis and/or upon occurrence of an event of a predetermined type. Thus, an actually optimal sequence may be continually updated, for example if the cost values of the zones are time dependent or were changed due to a re-determination. Thus, in a navigation system, re-determination of the optimal sequence during use may increase the accuracy and quality of the navigation system.

Additionally, the overall cost value of each sequence may be optimized under at least one predetermined constraint. In this way, additional information may be taken into account. For example, in the case of the car navigation system, a user may decide that only non-toll roads are to be considered. A constraint also may be imposed by zone or zones that a user chooses to avoid.

The foregoing may be used to determine a route based on the digital map data for the zones of a determined sequence of zones connecting two points. Thus, after determining an optimal sequence, a corresponding route, for example on the level of roads, may be determined to provide a user with navigation information. If navigation is desired in a context other than land vehicle navigation, for example, in the context of hiking or sailing, a route is not given by road information but via other information and parameters as are known.

In any case, the digital map data corresponding to the zones of the determined sequence may be combined to determine the route, and the map data of other zones is not required. Thus, the route may be determined in two steps: a sequence of zones may be determined and, based on this sequence of zones, the actual route information may obtained using the digital map data for only these zones, thus providing a faster and simpler way of determining a route.

Figure 6:
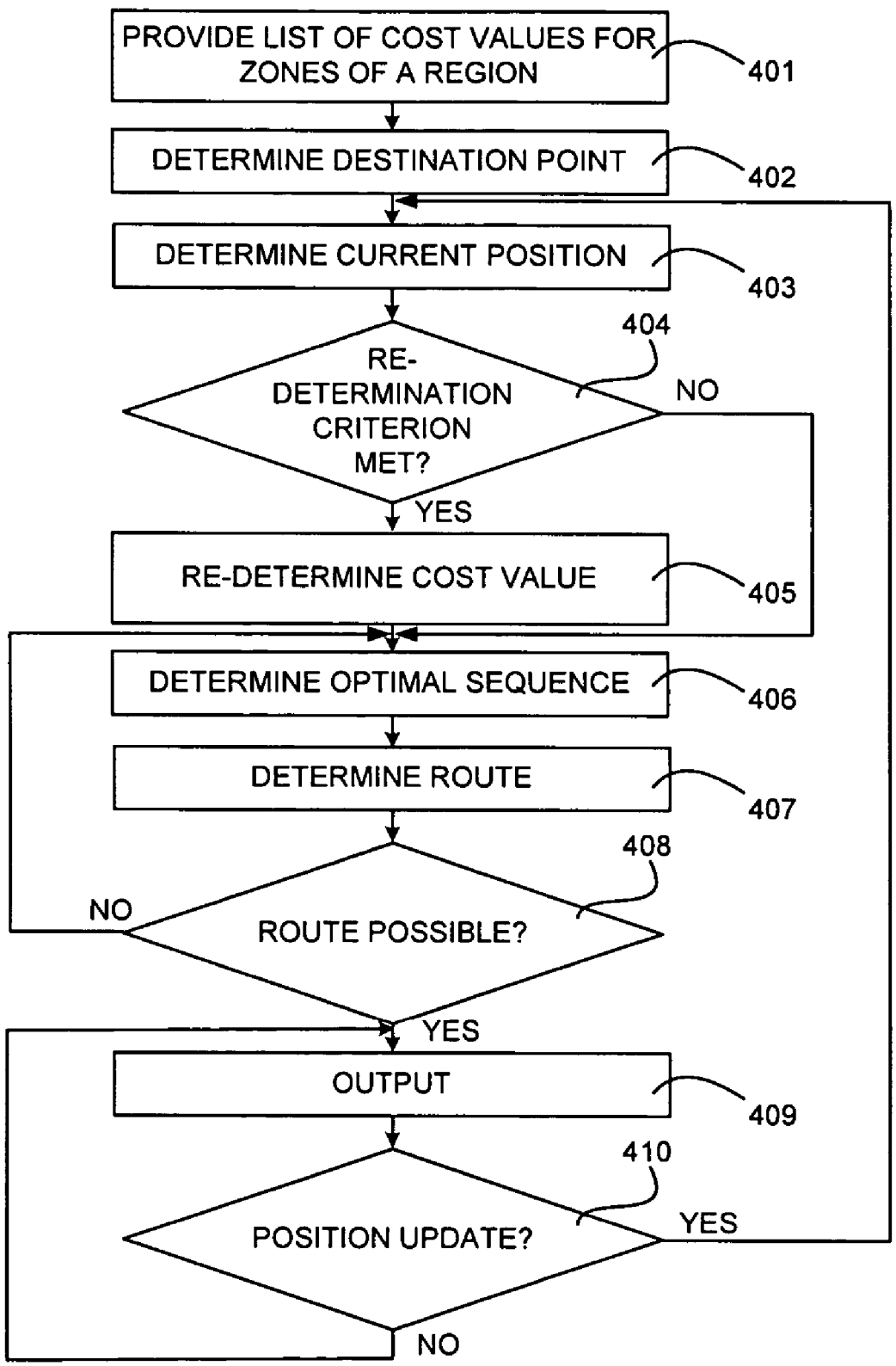
FIG. 6 illustrates sequences of zones.

FIG. 6 is a flow diagram illustrating an example of how to determine a route according to the methods disclosed. Although the steps are set forth in a particular order here, no particular order for performing the steps is required, and this example should not be considered limiting in any way.

A region may be divided into a plurality of zones and the cost values may be determined for each zone. The division may depend inter alia on the shape and the dimensions of the zones. A list of cost values for the zones of a region may be provided (401). At this point, different information and parameters may be given, for example whether and what parts of adjacent zones are to be considered when assessing the cost values, and/or the number of travel directions that may be considered. In addition, at least one cost criterion may be given, for example, the travel time or distance. However, the cost criteria need not be based on static parameters only such as time or distance. Dynamic information, for example, based on traffic messages or the like, may also be included.

The corresponding cost values may be determined for each travel direction and each zone. The cost values may be stored in a memory with a suitable data structure reflecting the adjacency relations between the zones, for example which zone is adjacent in what in direction. The list of cost values may be stored on a data carrier readable by a navigation system, for example a CD or DVD, though other storage media are contemplated.

More than one cost value for each travel direction and zone may also be determined. For example, the cost values may be time dependent. Alternatively or additionally, different cost values due to different cost criteria may be determined. In the latter case, sets of cost values may be obtained. For example, a first set may include the cost values given by the travel time (for each travel direction and zone), but excluding toll roads. A second set may include the cost values given by the travel time but including all possible roads in the zones.

A destination point may be determined (402). The destination point may be entered by a user in a number of ways. For example, a user may choose among a list of possible destinations stored in the system. Alternatively, a user may also enter coordinates of a destination point via a suitable input means such as a keyboard.

A current position may also be determined (402). This may be achieved using satellite based information (e.g., with the aid of GPS) and, particularly in the case of vehicle navigation, alternatively or additionally, information provided by movement sensors (e.g., speed sensor, gyroscope, and the like). The current position may also be entered manually. Then, the system may determine whether a cost value re-determination criterion is met (403). For example, after predetermined time intervals, the cost values may be determined again. Alternatively or additionally, such a re-determination also may be initiated by another event such as an incoming traffic message or a request by a user.

If re-determination criterion is met, cost values then may be re-determined (405). The re-determination need not be performed for all zones. For example, if the re-determination criterion is based on a traffic message, the cost value of only those zones affected by the traffic message may be determined again. The re-determination may include adding a predetermined value to the current (stored) cost values of a zone. For example, if a message is received that a traffic jam is no longer present in a zone, a negative value may be added to the cost value account for this new information. Alternatively or additionally, if a user wants to avoid certain zones, these zones may be provided with "penalty costs" by adding corresponding values to the current cost values.

If the re-determination criterion is not met, an optimal sequence of zones connecting the current position and the destination point is determined (406). The optimization may be based on a predetermined optimization criterion. Predetermined optimization criteria may depend on the cost values (or the cost criteria) that were provided in step 401. For example, if the cost values are based on the travel time or the travel distance, an optimal sequence of zones may be given by a sequence minimizing the sum of travel times or travel distances. However, the optimal sequence need not be unique.

Additional constraints also may be imposed for the optimization. For example, in the case of a car navigation system, a user may have decided to avoid specific zones. These constraints may be considered in different ways. On the one hand, they may be part of re-determining the cost (405). For example, if zones are to be avoided, these zones may be provided with "penalty" costs, i.e., costs in addition to the costs as determined by the general cost criterion. Alternatively, the constraints may be taken into account in determining the optimal sequence (406), for example, by not considering corresponding zones in the optimization procedure. Any number of algorithms, for example those identified previously, may be used to determine an optimal sequence. How the best sequence comprising a zone differs from the optimal sequence may also be determined. In this way, all zones may be rated by the difference in the overall cost value of the corresponding sequence compared to the optimal sequence.

An actual route may then be determined (407). The map data corresponding to the zones constituting the optimal sequence may be considered and an optimal route (according to a corresponding optimization criterion) may be determined. The resulting route information may include all necessary navigation data. In the case of a car navigation system, the route information may include information on the sequence of roads the user may take to reach the destination starting from the current position. Thus, consideration of map data of all the other zones is eliminated thereby decreasing the amount of time required to determine the route.

However, it may be that a route traveling through the zones of the sequence is not possible or only possible with additional, unexpected costs (408), for example, because the highway (that may have provided an excellent cost value in a specific zone) may not be reached because of the unavailability of an on ramp in the vicinity. In such a case, a new optimal sequence taking this constraint into account is determined (406).

If a route is possible, the route information then may be provided to the user of the system (409). The type of output depends on the type of system used and the circumstances. Usually, the output will be given optically and/or acoustically to the user, for example, in the case of a vehicle navigation system, by way of a video display or audio speaker. The route information relevant for the next moment or the next minutes may be output.

Finally, whether a position update criterion is met may be determined (410). For example, this criterion may be a predetermined time interval that has passed, an incoming traffic message, a corresponding input by a user, or the like. If the criterion is met, the current position is re-determined. If not or in parallel, the output of the route information continues.

A computer program product may be directly loaded into an internal memory of a digital computer comprising software code portions for performing the described methods. Further, a computer program product stored on a medium readable by a computer system may be provided comprising computer readable program means for causing a computer to perform the previously discussed methods.

While various aspects of the invention have been described, it will be apparent to those of ordinary skill in the art that many more aspects and implementations are possible within the scope of the invention. Accordingly, the invention is not to be restricted except in light of the attached claims and their equivalents.

What is claimed is:

1. A method for determining a route between two points, comprising:
    a) dividing a region into at least two zones;
    b) automatically determining at least one cost value for at least one direction of travel of a zone from digital map data of the zone and a predetermined cost criterion;
    c) automatically determining a sequence of zones connecting the two points, where each zone of the sequence of zones is adjacent to another zone of the sequence of zones such that the overall cost value of the sequence of zones is optimized; and
    d) determining a route of travel between the two points based on the sequence of zones.

2. The method of claim 1, further comprising, automatically determining all sequences of zones connecting the two points, where the overall cost value of the sequences of zones does not differ from the overall cost value of an optimal sequence by more than a predetermined threshold.

3. The method of claim 1, further comprising determining for a zone, a difference between the overall cost value of a sequence of zones comprising the zone and the overall cost value of an optimal sequence of zones.

4. The method of claim 1, further comprising automatically re-determining the at least one sequence of zones connecting the two points on a periodic basis.

5. The method of claim 1, further comprising automatically re-determining the at least one sequence of zones connecting the two points upon occurrence of a predetermined event.

6. The method of claim 1, where one of the two points is a current position and the other point is a destination point.

7. The method of claim 1, where the overall cost value of each sequence is optimized under at least one predetermined constraint.

8. The method of claim 7, where the constraint is the exclusion of a zone from the sequence of zones.

9. The method of claim 1, further comprising determining the route based on the digital map data for the zones of a determined sequence of zones connecting the two points.

10. The method of claim 1, where a computer program product comprising software code that is directly loadable into an internal memory of a digital computer performs the method.

11. The method of claim 1, where a computer program product that is stored in a medium readable by a computer system comprises computer readable program means for causing a computer to perform the steps of the method.

12. A method for processing digital map data to determine a route of travel, comprising:
dividing a region represented by digital map data into a plurality of zones;
determining one or more cost values corresponding to at least one direction of travel within each of the plurality of zones;
analyzing the cost values to determine a sequence of zones within the plurality of zones connecting two points; and
identifying a route of travel between the two points based on the sequence of zones.

13. The method of claim 12, where the cost values are determined from a travel distance for the at least one direction of travel within each of the plurality of zones.

14. The method of claim 13, where the cost values are proportional to the travel distance.

15. The method of claim 12, where the cost values are determined from a travel time for the at least one direction of travel within each of the plurality of zones.

16. The method of claim 15, where the cost values are proportional to the travel time.

17. The method of claim 12, where the cost values are determined from a combination of a travel distance and a travel time for the at least one direction of travel within each of the plurality of zones.

18. The method of claim 17, where the cost values are proportional to a combination of the travel distance and the travel time.

19. The method of claim 12, where the cost values include information relating to a predetermined part of an adjacent zone.

20. The method of claim 12, where each of the plurality of zones has a polygonal shape.

21. The method of claim 20, where the polygonal shape is selected from squares, rectangles, or hexagons.

22. The method of claim 12, further comprising periodically tiling the region.

23. The method of claim 20, further comprising determining one or more cost values for traversing a zone within the plurality of zones from one edge to at least one other edge of the zone.

24. The method of claim 20, further comprising determining one or more cost values for traversing a zone within the plurality of zones from one corner to at least one other corner of the zone.

25. The method of claim 20, further comprising determining one or more cost values for traversing a zone within the plurality of zones from one edge to at least one other edge and from one corner to at least one other corner of the zone.

26. The method of claim 12, further comprising determining a time dependent cost value for each of the plurality of zones.

27. The method of claim 12, further comprising automatically re-determining one or more cost values of a zone within the plurality of zones on a regular basis.

28. The method of claim 12, further comprising automatically re-determining one or more cost values of a zone within the plurality of zones upon occurrence of a predetermined event.

29. The method of claim 28, where the predetermined event relates to a traffic condition.

30. The method of claim 12, further comprising storing the one or more cost values for each of the plurality of zones.

31. The method of claim 30, where the storing comprises storing adjacency information for each of the plurality of zones.

32. The method of claim 12, where a computer program product comprising software code that is directly loadable into an internal memory of a digital computer performs the method.

33. The method of claim 12, where a computer program product that is stored in a medium readable by a computer system comprises computer readable program means for causing a computer to perform the steps of the method.

34. A method for assisting navigation, comprising:
dividing a region into a plurality of zones;
automatically determining one or more cost values for a direction of travel within each of the plurality of zones from digital map data of the zone and a predetermined cost criterion;
analyzing the cost values to automatically determine a sequence of zones within the plurality of zones connecting two points, where each zone of the sequence of zones is adjacent to another zone of the sequence of zones such that the overall cost value of the sequence of zones is optimized;
determining a route between the two points based on the sequence of zones; and
providing acoustic and or video output of route information.

35. The method of claim 34, where a computer program product comprising software code that is directly loadable into an internal memory of a digital computer performs the method.

36. The method of claim 34, where a computer program product that is stored in a medium readable by a computer system comprises computer readable program means for causing a computer to perform the steps of the method.

* * * * *